United States Patent
Weber

(10) Patent No.: US 6,205,767 B1
(45) Date of Patent: Mar. 27, 2001

(54) ADAPTER FITTING FOR USE WITH A GAS TURBINE AND FLUIDIZED-BED FURNACE

(75) Inventor: Thomas Weber, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/531,191

(22) Filed: Mar. 20, 2000

Related U.S. Application Data

(63) Continuation of application No. PCT/DE98/02641, filed on Sep. 7, 1998.

(30) Foreign Application Priority Data

Sep. 18, 1997 (DE) .............................................. 197 41 197

(51) Int. Cl.⁷ ..................................................... F02C 3/26
(52) U.S. Cl. ..................................... 60/39.12; 60/39.464
(58) Field of Search ............................. 60/39.12, 39.23, 60/3, 39.463, 39.464

(56) References Cited

U.S. PATENT DOCUMENTS

| | | | |
|---|---|---|---|
| 4,860,535 | * 8/1989 | Mansson et al. | ................. 60/39.464 |
| 5,161,367 | 11/1992 | Scalzo . | |
| 5,692,370 | * 12/1997 | Stuhlmullen et al. | ............ 60/39.464 |
| 5,694,762 | * 12/1997 | Wada | ................................ 60/39.464 |

FOREIGN PATENT DOCUMENTS

| | | |
|---|---|---|
| 0 088 933 | 9/1983 | (EP) . |
| 2 017 219 | 10/1979 | (GB) . |

OTHER PUBLICATIONS

"Die Standard–Gasturbine im Druckwirbelschicht–Einsatz" (Stuhlmüller et al.), dated 1995, VGB Kraftwerkstechnik 75, pp. 1037–1042, pertains to a standard gas turbine, used in a pressure turbulence mode, as mentioned on page 2 of the specification.

* cited by examiner

*Primary Examiner*—Louis J. Casaregola
(74) *Attorney, Agent, or Firm*—Herbert L. Lerner; Laurence A. Greenberg; Werner H. Stemer

(57) ABSTRACT

An adapter fitting for use in a stationary gas turbine installation which is provided with a compressor, a turbine, a combustion chamber and an external pressure-supercharged fluidized-bed furnace, is to be fitted between the turbine and the burner. The adapter fitting makes it possible to run various operating states of the gas turbine installation using various controllable inlets and outlets.

11 Claims, 1 Drawing Sheet

ADAPTER FITTING FOR USE WITH A GAS TURBINE AND FLUIDIZED-BED FURNACE

CROSS-REFERENCE TO RELATED APPLICATION

This application is a continuation of copending International Application No. PCT/DE98/02641, filed Sep. 7, 1998, which designated the United States.

BACKGROUND OF THE INVENTION

Field of the Invention

The invention relates to an adapter fitting for use in a stationary gas turbine installation having a compressor, a turbine, a combustion chamber and an external pressure-supercharged fluidized-bed furnace, the adapter fitting having:

a housing which can be fitted between a combustion-chamber connection flange and a combined connection flange for process air compressed by the compressor and for flue gas being discharged toward the turbine, a first line connection at the housing for fitting to the combined connection flange, with an inlet for process air compressed by the compressor and with an outlet for the flue gas, and a second line connection at the housing for fitting to the combustion-chamber connection flange, with an inlet for the flue gas emanating from the combustion chamber and with an outlet for the process air compressed by the compressor.

Such an adapter fitting is known from an article entitled "Die Standard-Gasturbine im Druckwirbelschicht-Einsatz" [The Standard Gas Turbine in Pressurized Fluidized-Bed Mode] by F. Stuhlmüller et al., in VGB Kraftwerkstechnik (1995), Volume 12, Pages 1037–1042 or from UK Patent Application GB 2 017 219 A.

Conventional gas turbines in which a pressure-supercharged fluidized-bed furnace is used instead of the combustion chamber to generate the hot flue gas are suitable for use in power plants. For that purpose, it is possible to use conventional gas turbine installations with two externally flanged-on combustion chambers. In that case, in order to connect the gas turbines to the pressure-supercharged fluidized-bed furnace system, it is merely necessary to remove the two combustion chambers and replace them with a connection fitting for the fluidized-bed furnace system. That connection fitting may, for example, be a concentric double-tube configuration, in which the flue gas emanating from the fluidized-bed furnace is guided in an inner tube to the gas turbine, while in an outer annular space the compressed process air generated by the compressor of the gas turbine installation is guided to the fluidized-bed furnace system.

The disadvantage of the low turbine inlet temperature of the flue gas in such fluidized-bed systems is eliminated by a further development, in which some of the coal being introduced is gasified, and the low calorific value combustion gas is used for further heating of the fluidized-bed flue gas before it enters the turbine.

In tried-and-tested configurations of such a gas turbine with a pressure-supercharged fluidized-bed furnace, the low calorific value combustion gas is added at a high temperature level, in such a way that the hot flue gases from the pressurized fluidized bed are mixed with compressed air from the compressor outlet of the gas turbine installation and are used as combustion air. The air inlet temperature at those burners is approximately 760° C.

Various problems arise because of that configuration:

High $NO_x$ levels are to be expected with combustion using hot combustion air.

Difficulties arise with the combustion, on one hand, of natural gas and, on the other hand, of low calorific value coal gas using a single combustion chamber which is operated with a high air inlet temperature.

The fluidized-bed flue gas may entrain ash particles which, upon passing through the flame during the addition of the coal gas, may melt.

Complex hot-gas fittings are required.

It is difficult to protect the gas turbine from running up unintentionally as a result of fluidized-bed flue gases.

The prior art has already developed burner types which are constructed for the combustion of low calorific value synthesis gas using hot combustion air while at the same time achieving acceptable $NO_x$ emissions. However, the problems of melting ash particles, with the use of complex hot-gas fittings and the heat losses caused by the use of concentric tubes through the cooling of the internally guided flue gas, have remained unsolved.

SUMMARY OF THE INVENTION

It is accordingly an object of the invention to provide an adapter fitting for use in a stationary gas turbine installation, which overcomes the hereinafore-mentioned disadvantages of the heretofore-known devices of this general type.

With the foregoing and other objects in view there is provided, in accordance with the invention, in a stationary gas turbine installation including a compressor for generating process air, a turbine, a combustion chamber producing flue gas and having a connection flange, and an external pressure-supercharged fluidized-bed furnace producing flue gas, an adapter fitting comprising a combined connection flange; a housing to be fitted between the combustion-chamber connection flange and the combined connection flange for the process air generated by the compressor and for the flue gas discharged toward the turbine; a first line connection at the housing to be fitted to the combined connection flange, the first line connection having an inlet for the process air generated by the compressor and an outlet for the flue gas; a second line connection at the housing to be fitted to the combustion-chamber connection flange, the second line connection having an inlet for the flue gas emanating from the combustion chamber and an outlet for the process air generated by the compressor; a third line connection having an inlet for the flue gas emanating from the fluidized-bed furnace; a fourth line connection having an outlet for discharging compressed process air to the fluidized-bed furnace and/or a coal gasification installation; the compressed process air outlets of the second and fourth line connections jointly communicating with the inlet of the first line connection; closure members for alternately opening and closing the compressed process air outlets of the second and fourth line connections; a flow passage disposed between the burner-side inlet of the second line connection for the flue gas and the outlet of the first line connection leading to the turbine; and at least one closure member to be opened and closed, the at least one closure member connecting the flow passage to the inlet of the third line connection for the flue gas emanating from the fluidized-bed furnace, for mixing the flue gas emanating from the fluidized-bed furnace with the combustion-chamber flue gas.

The inventive structure of this adapter fitting allows conventional gas turbines with external combustion chambers to be used. In this case, the adapter fitting is fitted between the gas turbine itself and the corresponding combustion chamber.

As a result of the connection provided between the inlet for the flue gas emanating from the fluidized-bed furnace or firing and the flow passage between the burner-side inlet for the burner flue gas and its outlet leading to the turbine, it is possible to add hot flue gases from the fluidized-bed furnace downstream of the combustion chamber. Therefore, the flue gases from the fluidized-bed furnace do not pass through the flame in the combustion chamber, thus substantially preventing ash particles which may be entrained in the fluidized-bed flue gases from melting.

As a result of the inlet-side guidance of the compressed process air, this air is fed directly to the combustion chamber. Therefore, it is possible to operate with low air inlet temperatures of the combustion air corresponding to the compressor outlet temperature of approximately 400° C. to 420° C. This significantly reduces the $NO_x$ emissions when using burners of standard construction.

The inventive structure of the adapter fitting also allows compressed process air to be discharged simultaneously to the fluidized-bed furnace and/or a coal gasification installation, with the result that there is no need for independent installation components for supplying process air to these components.

In accordance with another feature of the invention, the housing is constructed substantially as a dish with an outer wall, a base, a cover and a concentrically disposed annular insert.

In accordance with a further feature of the invention, the inlet of the third line connection for the flue gas emanating from the fluidized-bed furnace and the outlet of the fourth line connection for the process air leaving toward the fluidized-bed furnace and/or the coal gasification installation are disposed at diametrically opposite positions on the outer wall, the outer wall and the annular insert define an annular space therebetween, and partitions divide the annular space into an inlet space for the flue gas and an outlet space for the process air.

In accordance with an added feature of the invention, the inlet space and the outlet space take up circumferential angle ranges, and the circumferential angle range taken up by the inlet space is 15° to 25° larger than the circumferential angle range taken up by the outlet space.

In accordance with an additional feature of the invention, the inlet of the first line connection for the process air is disposed in the base of the housing and opens into the outlet space for the process air.

In accordance with yet another feature of the invention, the outlet of the second line connection for the process air to be discharged to the combustion chamber is disposed in the cover of the housing.

In accordance with yet a further feature of the invention, the annular insert has an aperture formed therein between the flow passage for the combustion-chamber flue gas and the inlet space for the flue gas emanating from the fluidized-bed furnace.

In accordance with yet an added feature of the invention, there are provided displaceable perforated diaphragms, all of the inlets, the outlets and the aperture constructed as series of openings correspondingly formed in the walls of the housing to be opened and closed by the diaphragms.

In accordance with yet an additional feature of the invention, the perforated diaphragms associated with the two process-gas outlets in the outlet space are coupled to one another in such a manner that opening one of the outlets closes the other of the outlets.

In accordance with again another feature of the invention, the two perforated diaphragms associated with the inlet and the aperture for the flue gases emanating from the fluidized-bed furnace are coupled for simultaneously opening and closing the inlet and the aperture.

In accordance with a concomitant feature of the invention, there are provided guide plates disposed in the inlet space for the flue gas emanating from the fluidized-bed furnace, for guiding a flow of the flue gas.

Other features which are considered as characteristic for the invention are set forth in the appended claims.

Although the invention is illustrated and described herein as embodied in an adapter fitting for use in a stationary gas turbine installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
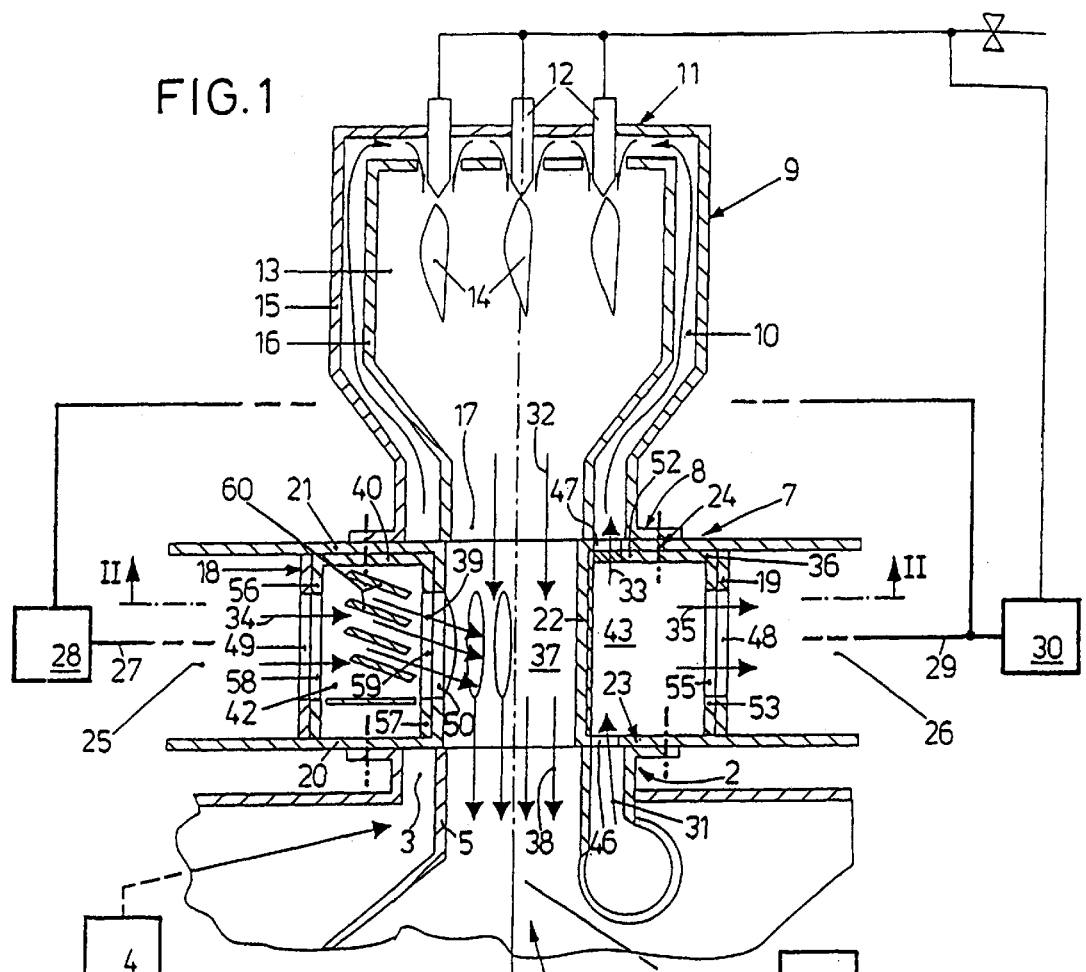
FIG. 1 is a fragmentary, diagrammatic, longitudinal-sectional view of an adapter fitting in position between a gas turbine installation and a combustion chamber.

Referring now to the figures of the drawings in detail and first, particularly, to FIG. 1 thereof, there is seen only a small part of an actual gas turbine installation 1, namely a combined connection flange 2. This flange has an annular opening 3 for compressed process air supplied from a compressor 4 and an insert line 5 which rests concentrically therein for hot flue gas flowing toward a turbine 6.

An adapter fitting 7 is positioned between the combined connection flange 2 and a connection flange 8 of a combustion chamber 9. The connection flange 8 of the combustion chamber 9 has an outer ring line 10 with an opening which is open toward the connection flange 8 and leads to a head 11 of the combustion chamber 9. The process air is guided through the ring line 10 to burners 12 in the head 11 of the combustion chamber 9, where it is used for combustion of natural gas or synthesis gas. The combustion operation is indicated by flames 14. An inner space 13 of the conventional combustion chamber 9 is formed by a dish insert 16 disposed concentrically in a burner housing 15. This dish insert 16 forms an opening 17 toward the connection flange 8 for the hot flue gas generated by the combustion chamber 9.

Figure 2:
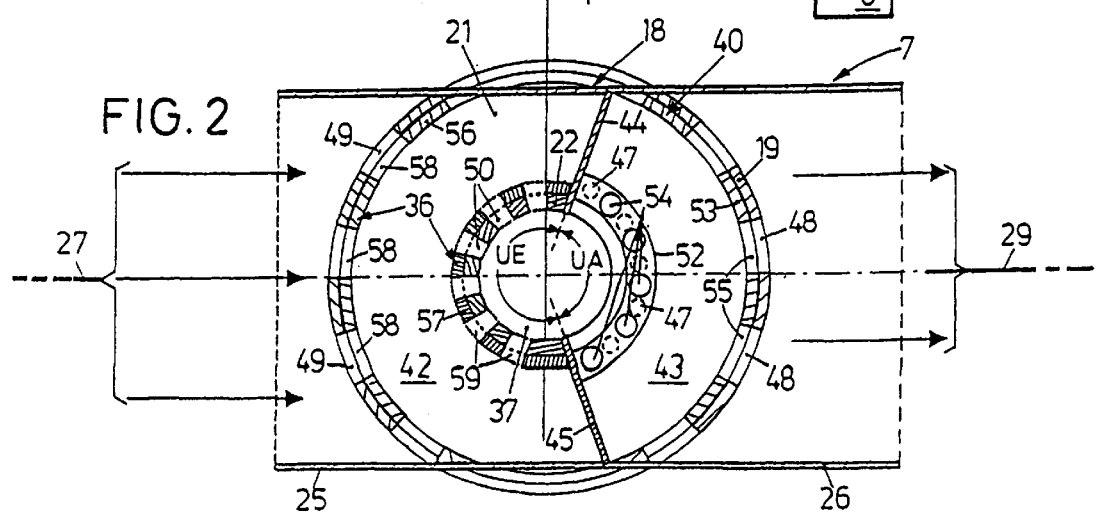
FIG. 2 is a cross-sectional view of the adapter fitting, which is taken along a line II—II of FIG. 1, in the direction of the arrows.

As can be seen from FIGS. 1 and 2, a housing 18 of the adapter fitting 7 is constructed substantially as a dish with a cylindrical outer wall 19, a base 20, a cover 21 and a concentrically disposed annular insert 22. The housing 18 must have a first line connection 23, through the use of which the adapter fitting 7 is disposed on the combined connection flange 2. The housing 18 is fitted to the connection flange 8 of the combustion chamber 9 through the use of a second line connection 24. Third and fourth line connections 25, 26 are connected to a flue-gas discharge line 27 of a pressure-charged fluidized-bed furnace or firing 28 and to a process-air supply 29 leading to this fluidized-bed furnace 28 and to an optionally present coal gasification plant 30, as is diagrammatically indicated by lines. The fluidized-bed furnace 28 and the coal gasification plant or installation 30 are likewise only indicated by black boxes in FIG. 1, as in a block diagram. The third and fourth line connections 25, 26 are located at diametrically opposite positions of the adapter fitting 7 and are each formed by attached rectangular tubes, as is evident by considering FIGS. 1 and 2 together.

The following text explains the inlets, outlets and apertures in the adapter fitting, which are represented by arrows in each of FIGS. 1 and 2. For example, the first line connection 23 is provided with an inlet 31 for the process air which has been compressed by the compressor 4. The second line connection 24 has an inlet 32 for the flue gas flowing out of the combustion-chamber inner space 13 and an outlet 33 for the process air generated by the compressor. Furthermore, the third line connection 25 has an inlet 34 for the flue gas emanating from the fluidized-bed furnace, and the fourth line connection 26 has an outlet 35 for discharging compressed process air to the fluidized-bed furnace 28 and to the coal gasification installation 30.

In a manner which will be explained in more detail below, the two outlets 33, 35 for the compressed process air are in joint communication with the inlet 31 and can be alternately opened and closed through the use of closure members 36. Furthermore, a flow passage 37 through the annular insert 22 is provided centrally in the housing 18 between the burner-side inlet 32 for the flue gas and its outlet 38 at the first line connection 23 leading to the turbine.

The flow passage 37 has an aperture 39 leading to the inlet 34 at the third line connection 25, allowing flue gas emanating from the fluidized-bed furnace to be mixed with the combustion-chamber flue gas. The aperture 39 and the inlet 34 at the third line connection 25 can be opened and closed through the use of a closure member 40, which will be explained in more detail below.

As can be seen from FIGS. 1 and 2, in an annular space formed between the outer wall 19 and the annular insert 22 there is an inlet space 42 on one side between the inlet 34 and the aperture 39 for the flue gas emanating from the fluidized-bed furnace. On the other side of the annular space there is an outlet space 43 which forms a connection between the two outlets 33 and 35 and the inlet 31 for the compressed process air. The inlet space 42 and the outlet space 43 are separated from one another by radially extending partitions 44, 45 in the annular space. As is seen in FIG. 2, the inlet space 42 takes up a circumferential angle UE which is approximately 40° larger than a circumferential angle UA of the outlet space 43, since the fluidized-bed flue gas has a greater volumetric flow rate and mass flow rate than the combustion air.

The structure and configuration of the individual inlets and outlets are explained in more detail below. For example, the inlet 31 for the process air supplied by the compressor 4 is formed by a series of holes 46 in the base 20 of the housing 18, which are disposed along an arc of a circle. The series of holes runs along the wall of the annular insert 22, over the circumferential angle UA of the outlet space 43. The cover 21 of the housing 18 also has holes 47 axially aligned with these holes 46. The holes 47 form the outlet 33 for the compressed process air. Furthermore, a series of holes 48, which form the outlet 35 for the compressed process air, is provided in the outer housing wall 19, facing the fourth line connection 26.

A series of holes 49 in the outer wall of the housing 18, which form the inlet 34 for the flue gas from the fluidized-bed furnace 28, are likewise made diametrically opposite. Holes 50 in that part of the annular insert 22 which faces toward the inlet space 42 form the aperture 39 for this flue gas leading to the flow passage 37.

As can be seen from FIG. 1, the series of holes 47, 48 can be opened and closed through the use of the common closure member 36 which is formed from two perforated diaphragms 52, 53 that are connected to one another. These perforated diaphragms 52, 53 run along the corresponding walls of the housing which have the respective holes 47 and 48, and can be displaced in the circumferential direction. As can be seen from FIGS. 1 and 2, openings 54, 55 in the perforated diaphragms 52, 53 have an area which corresponds to the respective holes 47 and 48. The openings 54, 55 are disposed in such a way that, for example, when the openings 55 in the perforated diaphragm 53 are completely congruent with the holes 48 (fitting position shown in FIGS. 1 and 2), the openings 54 in the perforated diagram 52 are not aligned with the holes 47 of the outlet 33. The outlet 33 is consequently closed, whereas the outlet 35 is fully open. In the event of the closure member 36 being rotated in the circumferential direction, the holes 48 are successively closed, whereas the holes 47 are successively opened, until ultimately in a non-illustrated other limit position of the closure member 36, the outlet 33 is fully open and the outlet 35 is fully closed. Operating states which can be brought about through actuation of the closure member 36 are explained in more detail at the end of this description.

The closure member 40 which opens and closes the inlet 34 and the aperture 39 also has two perforated diaphragms 56, 57 which are connected to one another and are used to open and close the holes 49, 50. In this case, openings 58, 59 in the perforated diaphragms 56, 57 are disposed in such a way with respect to one another that in one limit position (FIGS. 1 and 2) all of the holes 49, 50 are completely open. As a result of rotation of the closure member 40, the holes 49, 50 are successively closed by the perforated diaphragm 56, 57, until it is no longer possible for any flue gas to pass through.

Finally, it should be noted that inclined guide plates 60 for guiding the flow of the flue gas are disposed in the inlet space 42 for the flue gas emanating from the fluidized-bed furnace 28. These guide plates 60 produce a lower pressure loss and produce good mixing of the fluidized-bed flue gas with the flue gas flowing out of the combustion chamber 13.

With regard to the materials used for the adapter fitting 7, it should be noted that the annular insert 22, acting as an inner shell, is constructed to withstand high temperatures. It is thus able to absorb the thermal loads imposed on the fitting. The outer shell formed by the outer wall is formed of low-alloy cast steel and absorbs mechanical loads imposed on the adapter fitting 7. It thus forms the actual "backbone" of the fitting.

Due to the two closure members 36, 40, the adapter fitting 7 offers variable operating and control options, which can be explained as follows:

Standard operation of the gas turbine installation using only natural gas or synthesis gas:

The inlet 34 and the aperture 38 are closed by appropriately setting the closure member 40. Consequently, the flue-gas path from the fluidized-bed furnace 28 into the turbine 6 is blocked. Furthermore, the closure member 36 is set in such a way that the outlet 33 is completely open and the outlet 35 is completely closed. The compressed process air flowing into the outlet space 43 through the inlet 31, which is always open, thus all passes to the burners 12, where it is used for combustion of the synthesis gas supplied from the coal gasification installation 30 through a feed line 61 or the natural gas provided through a feed-in line 62. At the same time, the process air flowing in the ring line 10 to the burner head 11 cools the combustion chamber 9.

Pure fluidized-bed furnace mode:

The closure member 40 is set in such a way that the inlet 34 and the aperture 39 are completely open. The closure member 36 is positioned in such a way that the outlet 33 is fully closed and the outlet 35 is fully open. Consequently, on one hand the flue-gas path from the fluidized-bed furnace through the inlet space 42 and the flow passage 37 to the turbine 6 is open. As a result, the fluidized-bed flue gas can be used to operate the turbine. The closure member 36 is positioned in such a way that the outlet 33 is fully closed and the outlet 35 is fully open. Consequently, all of the compressed process air passes to the fluidized-bed furnace 28, where it is used for combustion.

Combined operation with fluidized-bed furnace, coal gasification and synthesis gas burner:

The closure member 36 is disposed in a middle position, so that both the outlet 33 and the outlet 35 are partially open. In this case, it should be ensured that a similar pressure drop is brought about through both outlets 33, 35, so that the compressed process air does not flow through only one of the two outlets. In particular, for combined operation, structural measures are to be provided in the area of the outlet 33 leading to the combustion chamber 9, so that a suitable pressure drop is brought about. This is because a relatively high back pressure is built up toward the fluidized-bed furnace 28 as a result of the fluidized bed, gas cleaning and a fluidized-bed cooler which is normally present. At any rate, the compressed process air on one side passes to the combustion chamber 9 and on the other side passes to the fluidized-bed furnace 28. In other words, the compressed process air is used on one hand for combustion in the fluidized-bed furnace 28 and on the other hand for operating the combustion chamber 9. The distribution of power between the fluidized-bed furnace 28 and the combustion chamber 9 can be adjusted through the use of the ratio of air passing through the outlets 33, 35, which can be adjusted through the use of the position of the closure member 36. Furthermore, in this operating mode the closure member 40 is in an open position, so that the flue-gas path from the fluidized-bed furnace 28 to the flow passage 37 is open. The fluidized-bed flue gas, which arrives at a temperature of approximately 750 to 950° C., is mixed with the combustion-chamber flue gas (temperature of approximately 1400° C.) in the flow passage 37, so that a flue-gas temperature at the entry to the turbine 6 of approximately 1000 to 1200° C. is established.

Emergency shut-down of the gas turbine:

In the event of a fault, for example in the event of the gas turbine shedding load, the turbine has to be protected from running up as a result of the fluidized-bed flue gases. For this purpose, the closure member 40 is to be provided with a rapid-adjustment feature. In the event of an emergency shut-down, the outlet 35 is closed by the closure member 36 and the outlet 33 is fully opened. Consequently, all of the compressed process air flows into the combustion chamber 9 where, however, at the same time the supply of fuel is severely restricted or interrupted altogether. The excess process air flows out through the combustion chamber 9 and the flow passage 37 through the turbine 6 where, however, no power is generated due to the lack of heating in the combustion chamber 9. At the same time, the inlet 34 and the aperture 39 are rapidly closed, with the result that it is no longer possible for any flue gas to pass from the fluidized-bed furnace 28 to the turbine 6. Consequently, the turbine 6 cannot run up.

I claim:

1. In a stationary gas turbine installation including a compressor for generating process air, a turbine, a combustion chamber producing flue gas and having a connection flange, and an external pressure-supercharged fluidized-bed furnace producing flue gas, an adapter fitting comprising:

a combined connection flange;

a housing to be fitted between the combustion-chamber connection flange and said combined connection flange for the process air generated by the compressor and for the flue gas discharged toward the turbine;

a first line connection at said housing to be fitted to said combined connection flange, said first line connection having an inlet for the process air generated by the compressor and an outlet for the flue gas;

a second line connection at said housing to be fitted to said combustion-chamber connection flange, said second line connection having an inlet for the flue gas emanating from the combustion chamber and an outlet for the process air generated by the compressor;

a third line connection having an inlet for the flue gas emanating from the fluidized-bed furnace;

a fourth line connection having an outlet for discharging compressed process air to at least one of the fluidized-bed furnace and a coal gasification installation;

said compressed process air outlets of said second and fourth line connections jointly communicating with said inlet of said first line connection;

closure members for alternately opening and closing said compressed process air outlets of said second and fourth line connections;

a flow passage disposed between said burner-side inlet of said second line connection for the flue gas and said outlet of said first line connection leading to the turbine; and at least one closure member to be opened and closed, said at least one closure member connecting said flow passage to said inlet of said third line connection for the flue gas emanating from the fluidized-bed furnace, for mixing the flue gas emanating from the fluidized-bed furnace with the combustion-chamber flue gas.

2. The adapter fitting according to claim 1, wherein said housing is constructed substantially as a dish with an outer wall, a base, a cover and a concentrically disposed annular insert.

3. The adapter fitting according to claim 2, wherein said inlet of said third line connection for the flue gas emanating from said fluidized-bed furnace and said outlet of said fourth line connection for the process air leaving toward at least one of the fluidized-bed furnace and the coal gasification installation are disposed at diametrically opposite positions on said outer wall, said outer wall and said annular insert define an annular space therebetween, and partitions divide said annular space into an inlet space for the flue gas and an outlet space for the process air.

4. The adapter fitting according to claim 3, wherein said inlet space and said outlet space take up circumferential angle ranges, and said circumferential angle range taken up by said inlet space is 15° to 25° larger than said circumferential angle range taken up by said outlet space.

5. The adapter fitting according to claim 3, wherein said inlet of said first line connection for the process air is disposed in said base of said housing and opens into said outlet space for the process air.

6. The adapter fitting according to claim 2, wherein said outlet of said second line connection for the process air to be discharged to the combustion chamber is disposed in said cover of said housing.

7. The adapter fitting according to claim 3, wherein said annular insert has an aperture formed therein between said flow passage for the combustion-chamber flue gas and said inlet space for the flue gas emanating from said fluidized-bed furnace.

8. The adapter fitting according to claim 7, including displaceable perforated diaphragms, all of said inlets, said outlets and said aperture constructed as series of openings correspondingly formed in said walls of said housing to be opened and closed by said diaphragms.

9. The adapter fitting according to claim 8, wherein said perforated diaphragms associated with said two process-gas outlets in said outlet space are coupled to one another in such a manner that opening one of said outlets closes the other of said outlets.

10. The adapter fitting according to claim 8, wherein said two perforated diaphragms associated with said inlet and said aperture for the flue gases emanating from the fluidized-bed furnace are coupled for simultaneously opening and closing said inlet and said aperture.

11. The adapter fitting according to claim 3, including guide plates disposed in said inlet space for the flue gas emanating from the fluidized-bed furnace, for guiding a flow of the flue gas.

* * * * *